United States Patent [19]

Pollock

[11] Patent Number: 5,660,724

[45] Date of Patent: Aug. 26, 1997

[54] MULTI-PRESSURE HEAD TANK FOR USE WITH VERTICAL SHAFT BIOREACTORS

[75] Inventor: David C. Pollock, Calgary, Canada

[73] Assignee: Deep Shaft Technology Inc., Calgary, Canada

[21] Appl. No.: 654,145

[22] Filed: May 28, 1996

[51] Int. Cl.⁶ .................................................. C02F 3/22
[52] U.S. Cl. ..................... 210/104; 210/151; 210/188; 210/195.1; 210/221.2; 210/603; 210/629
[58] Field of Search ................................. 210/104, 150, 210/151, 188, 603, 604, 629, 916, 194, 195.1, 195.3, 195.4, 220, 221.1, 221.2

[56] References Cited

U.S. PATENT DOCUMENTS

| | | | |
|---|---|---|---|
| 4,086,160 | 4/1978 | Roesler | 210/629 |
| 4,230,563 | 10/1980 | Roesler | 210/629 |
| 4,253,949 | 3/1981 | Hines et al. | 210/194 |
| 4,272,375 | 6/1981 | Pollock | 210/194 |
| 4,272,379 | 6/1981 | Pollock | 210/629 |
| 4,278,546 | 7/1981 | Roesler | 210/629 |
| 4,279,754 | 7/1981 | Pollock | 210/629 |
| 4,287,070 | 9/1981 | Pollock | 210/629 |
| 4,340,484 | 7/1982 | Pollock et al. | 210/607 |
| 4,367,146 | 1/1983 | Pollock et al. | 210/608 |
| 4,407,718 | 10/1983 | Pollock | 210/629 |
| 4,416,781 | 11/1983 | Bailey et al. | 210/629 |
| 4,806,148 | 2/1989 | Ottengraf | 210/916 |

*Primary Examiner*—Cynthia L. Nessler
*Attorney, Agent, or Firm*—Cushman Darby & Cushman IP Group Pillsbury Madison & Sutro LLP

[57] ABSTRACT

A multi-channel vertical shaft bioreactor having a downcomer; a riser operatively in communication with the downcomer to form a loop; an off-gas head tank; a part of the loop being through the head tank; a de-gassing plate around which effluent liquor is de-gassed to produce a de-gassed liquor and an off-gas receivable by the head tank; oxygen containing gas injection means for injecting gas into the riser; liquid influent injection means to inject influent into the riser; means to extract liquid effluent from the bioreactor; the improvement comprising one or more vertical baffle plates disposed within an upper part of the head tank to define a plurality of off-gas receiving chambers; a plurality of biofilters, a plurality of off-gas conduits in communication with the chambers and the biofilters to operably allow passage of off-gas from the chambers to the biofilters to effect off-gas aeration in the biofilters; and conduit off-gas controls for the treatment of waste water. Each of the multiple gas confinement compartments in the single head tank can operate at different pressures and enable each of the biofilters to be independently back-washed.

11 Claims, 2 Drawing Sheets

MULTI-PRESSURE HEAD TANK FOR USE WITH VERTICAL SHAFT BIOREACTORS

FIELD OF THE INVENTION

This invention relates to vertical shaft bioreactors for the treatment of wastewater; and particularly to head tanks for receiving off-gas produced in said bioreactors.

BACKGROUND TO THE INVENTION

Long vertical shaft bioreactor systems suitable for the treatment of waste water by activated sludge processes are known and disclosed as for example, in U.S. Pat. No. 4,279,754 to Pollock.

A deep vertical shaft bioreactor system for the treatment of waste water, typically, comprises a bioreactor, a solid/liquid separator and intervening apparatus in communication with the bioreactor and separator. As fully described in aforesaid U.S. Pat. No. 4,279,754 such bioreactors essentially comprise a circulatory system which includes at least two substantially vertical side-by-side chambers in communication with each other at their upper and lower ends, with their upper ends being connected through a basin. The waste water for treatment is caused to circulate repeatedly through and between the downflow chamber (the downcomer) and the upflow chamber (the riser). Normally, the waste-containing liquor, referred to as mixed liquor, is driven through the circulating system by injection of an oxygen-containing gas, usually air, into one or both of the chambers. Typically, in a 500 feet deep reactor, air injection is at a depth of about 200 feet with the air at a pressure of 100 pounds per square inch. At start-up of the bioreactor, a mixture of air and influent waste water is injected into the riser in the nature of an air lift pump. However, once circulation of the mixed liquor begins, air injection can be also into the downcomer. The fluid in the downcomer having a higher density than the liquid-bubble mixture of the riser, thereby provides a sufficient lifting force to maintain circulation. Usually the basin is fitted with a baffle to force mixed liquor at the top of the riser to traverse a major part of the basin releasing spent gas before again descending the downcomer for further treatment.

Influent waste water is introduced at depth into the riser chamber through an upwardly directed outlet arm of an influent conduit. An oxygen-containing gas, usually air, is injected into the influent liquor in the outlet arm of the influent liquor conduit. In addition to oxygenating the waste liquor, the injected gas acts to create an air lift pump which draws the influent waste into the bioreactor riser. Effluent liquor is withdrawn from the riser through an effluent liquor conduit having its inlet located in the riser at a point below the outlet of the influent liquor conduit. During operation of the bioreactor the flow of influent liquor to and effluent from the bioreactor are controlled in response to changes in level of liquid in the connecting upper basin.

The injected oxygen-containing gas dissolves in the mixed liquor as the liquor descends in the downcomer to regions of greater hydrostatic pressure. This dissolved oxygen constitutes the principal reactant in the biochemical degradation of the waste. As the circulating mixed liquor ascends in the riser to regions of lower hydrostatic pressure the dissolved gas separates and form bubbles. When the liquid/bubble mixture from the riser enters the basin, gas disengagement occurs.

Reaction between waste, dissolved oxygen, nutrients and biomass substantially takes places during circulation through the downcomer, riser and basin bioreactor system. The products of the reaction are carbon dioxide, and additional biomass which in combination with unreacted solid material present in the influent waste water forms a sludge.

The term "Waste Water" as used herein is understood to include water carrying any type of biodegradable domestic and industrial waste materials, for example, normal domestic waste and the effluents produced by farms, food factories, refineries, pulp mill, breweries and other industries. By "mixed liquor" is meant the mixture of liquids and solids present in the bioreactor system.

Pressurized head tanks utilizing off-gas back pressures for bioreactor waste water flow control and off-gas treatment are disclosed, for example, in U.S. Pat. No. 4,272,379 to Pollock. In such designs, foam, air borne microbes, volatile organic compounds, and some biological solids are swept by off-gas from the head tank into an oxidiation tank through an injection pipe having one end submerged in liquid. The submergence of the pipe determines the back pressure on the shaft bioreactor and consequently the exit velocity of liquid in the deep extraction line. This liquid exit velocity is critical for subsequent successful flotation. This submergence also causes the generation of course bubbles and a partial fractionation of the foam. The off-gas serves to aerate and mix the liquid in the oxidation tank.

Aforesaid U.S. Pat. No. 4,272,379 describes a vertical shaft bioreactor comprising an enclosed head tank, a downcomer and riser operatively communicating with each other at their upper and lower extremities, communication at the upper extremities being through the head tank, means for directing influent waste to the riser, means for removing effluent waste from the riser, means for injecting an oxygen containing gas, normally air, into the waste within the riser and downcomer, gas conduit means in the head tank for venting gas therethrough into an adjacent collection vessel, the end of the gas-venting conduit in the collection vessel being immersed in a predetermined depth of waste liquid in the collection vessel, liquid conduit means in the head tank for venting liquid therethrough into the adjacent collection vessel, the end of the liquid venting conduit being immersed in the collection vessel liquid at a lower level than the end of the gas-venting conduit, the collection vessel having overflow conduit means for transferring waste liquid from the collection vessel to the bioreactor influent stream, the overflow conduit means being positioned to control the level of liquid in the collection vessel, thereby controlling the pressure exerted by the liquid upon the gas vented from the head tank, and thereby controlling the back pressure exerted by the gas upon the shaft.

The term "off-gas" means the gas from the bioreactor shaft effluent coming out of solution upon being recycled to the surface basin and lower pressure regimes of the bioreactor. Foam, air borne microbes, and volatile organic compounds (VOC's) present in the off-gas stream of a vertical shaft bioreactor system present environmental problems. In one prior art bioreactor system, the foam, along with some biological solids, is swept by the off-gas from the head tank into a foam, oxidation tank through an injection pipe having its end submerged in liquid. The submergence of the pipe determines the back pressure in the shaft and consequently the exit velocity of liquid in the deep extraction line. This submergence also causes the generation of course bubbles and a partial fractionation of the foam The off-gas serves to aerate and mix the liquid in the foam tank.

In a later prior art bioreactor system, an "air tuning" method was developed to regulate the flow of the deep extraction line in a step-wise fashion according to waste water feed rate. This was achieved by submerging off-gas feed lines at varying depths in the foam tank to give step-wise changes in back-pressure within the head tank.

Prior art teaches that when the aeration off-gases from a vertically oriented shaft bioreactor are contained in the head space above the liquid level in the head tank of the bioreactor, the pressure developed in the head space is equal to the pressure associated with the depth of submergence of the off-gas vent in the liquid in an adjacent open top vessel. When more than one off-gas vent is used, all vents of equal submergence operate at the same back pressure. Different head space pressures can be achieved by re-routing the off-gas into vents set at different submergence depths in the adjacent vessel. Re-routing the off-gas can be achieved by allowing the rise or fall of liquid level in the head space to "open" or "close off" vents of different submergence depth. This causes a step wise pressure change. However, only one head space pressure can exit at a time.

The present invention provides multiple gas confinement compartments in a single head tank. Each compartment can operate at a different pressure in response to back pressures created by equal submergence depth of off-gas vents in adjacent open-top vessels. Each of the vessels contains inert media on which biomass grow to cause different operating pressures in the respective biofilters. Changing head space pressures even during air scour and backwashing does not significantly change the level of liquid in a water column hydraulically connected to the head tank. Changing the liquid level in the hydraulically connected water column does not change the pressure in the head space. The head space pressures can change gradually responding to operational changes in the bio-filters.

SUMMARY OF THE INVENTION

The present invention provides a vertical shaft bioreactor system having an improved flooded biofilter foam/oxidation tank, pressurized head tank and aeration distribution/purge system, wherein a single head tank operates with a plurality of biofilters, optionally, at different off-gas back pressures, simultaneously, while maintaining a fixed hydraulic head on the vertical shaft. A "biofilter" is an attached growth system in which micro-organisms in activated sludge grow on a submerged inert support medium, such as, for example, expanded shale having a grain size of approximately 6 min. A "sparger" is a pipe conduit containing holes along its length for the purpose of delivering air to a biofilter mass or for air scouring and backwashing of filters, and "backwash" is the term for purging of the biofilter media from floc (flocculent material) build-up by means of water and air scour. Due to the nature of the head losses across the media bed and the need for filter shutdown during backwash, each filter operates at a different back-pressure. A single or multiple baffled compartmentalized head tank is provided to accommodate these process requirements without disturbing the vertical shaft bioreactor operation.

Accordingly, in its broadest aspect the invention provides a multi-channel vertical shaft bioreactor having a downcomer; a riser operatively in communication with said downcomer to form a loop; an off-gas head tank; a part of said loop being through said head tank; a de-gassing plate around which effluent liquor is de-gassed to produce a de-gassed liquor and an off-gas receivable by said head tank; oxygen containing gas injection means for injecting gas into said riser; liquid influent injection means to inject influent into said riser; means to extract liquid effluent from said bioreactor; the improvement comprising one or more vertical baffle plates disposed within an upper part of said head tank to define a plurality of off-gas receiving chambers; a plurality of biofilter means, a plurality of off-gas conduit means in communication with said chambers and said biofilter means to operably allow passage of off-gas from said chambers to said biofilter means to effect off-gas aeration in said biofilter means; and conduit off-gas control means.

Each of the head tank chambers may have a single dedicated conduit for off-gas transfer only from that chamber to a single corresponding biofilter. Alternatively, there may be a plurality of conduits defining a conduit network feeding off-gas from one or more of the chambers to one or more of the biofilters, provided that each of the conduits has individual control means to operably control and direct off-gas from any chamber to any biofilter, as desired, to effect not only biofiltration, but also controllably backwashing of any selected biofilter as required, while continuous operation of feeding off-gas to one or more other biofilters is undertaken.

In a preferred aspect, I provide a multi-channel vertical shaft bioreactor as hereinabove defined comprising a downcomer;

a riser operatively in communication with said downcomer to form a loop;

an off-gas head tank;

wherein a part of said loop is through said head tank; a de-gassing plate around which effluent liquor is de-gassed to produce a de-gassed liquor and an off-gas receivable by said head tank; the improvement comprising a plurality of vertical baffle plates disposed within an upper part of said head tank to define a plurality of off-gas receiving chambers comprising a first chamber and a second chamber;

a plurality of biofilter means comprising a first biofilter means and a second biofilter means;

a plurality of off-gas conduit means comprising a first conduit means in communication with said first chamber and said first biofilter means to operably allow passage of off-gas from said first chamber to said first biofilter means to effect off-gas aeration in said first biofilter means;

a second conduit means in communication with said second chamber and second biofilter means to operably allow passage of off-gas from said second chamber to said second biofilter means to effect off-gas aeration in said second biofilter means; first conduit control valve means; and second conduit control valve means.

In a more preferred aspect, the invention provides in one aspect a multi-channel vertical shaft bioreactor having a downcomer; a riser operatively in communication with said downcomer to form a loop; a part of said loop being through a head tank; an off-gas head tank; a de-gassing plate around which effluent liquor is degassed to produce a degassed liquor and an off-gas receivable by said head tank; the improvement comprising a plurality of vertical baffle plates disposed within an upper part of said head tank to define a plurality of off-gas receiving chambers comprising a first chamber, a second chamber and a third chamber; a plurality of biofilter means comprising a first biofilter means, a second biofilter means and a third biofilter means; a plurality of off-gas conduit means comprising a first conduit means in communication with said first chamber and said first biofilter means to operably allow passage of off-gas from said first chamber to said first biofilter means; a first conduit gas-flow control means; a second conduit means in communication with said second chamber and said second biofilter means to operably allow passage of off-gas from said second chamber to said second biofilter means; a second conduit gas-flow control means; a third conduit means in communication with said third chamber and said third biofilter means to operably allow passage of off-gas from third chamber to said third biofilter means; a third conduit gas-flow control means to effect off-gas aeration in said first, said second and said third biofilter means.

BRIEF DESCRIPTION OF THE DRAWINGS

In order that the invention may be better understood, a preferred embodiment will now be described by way of example only, wherein.

DETAILED DESCRIPTION OF A PREFERRED EMBODIMENT

Figure 1:
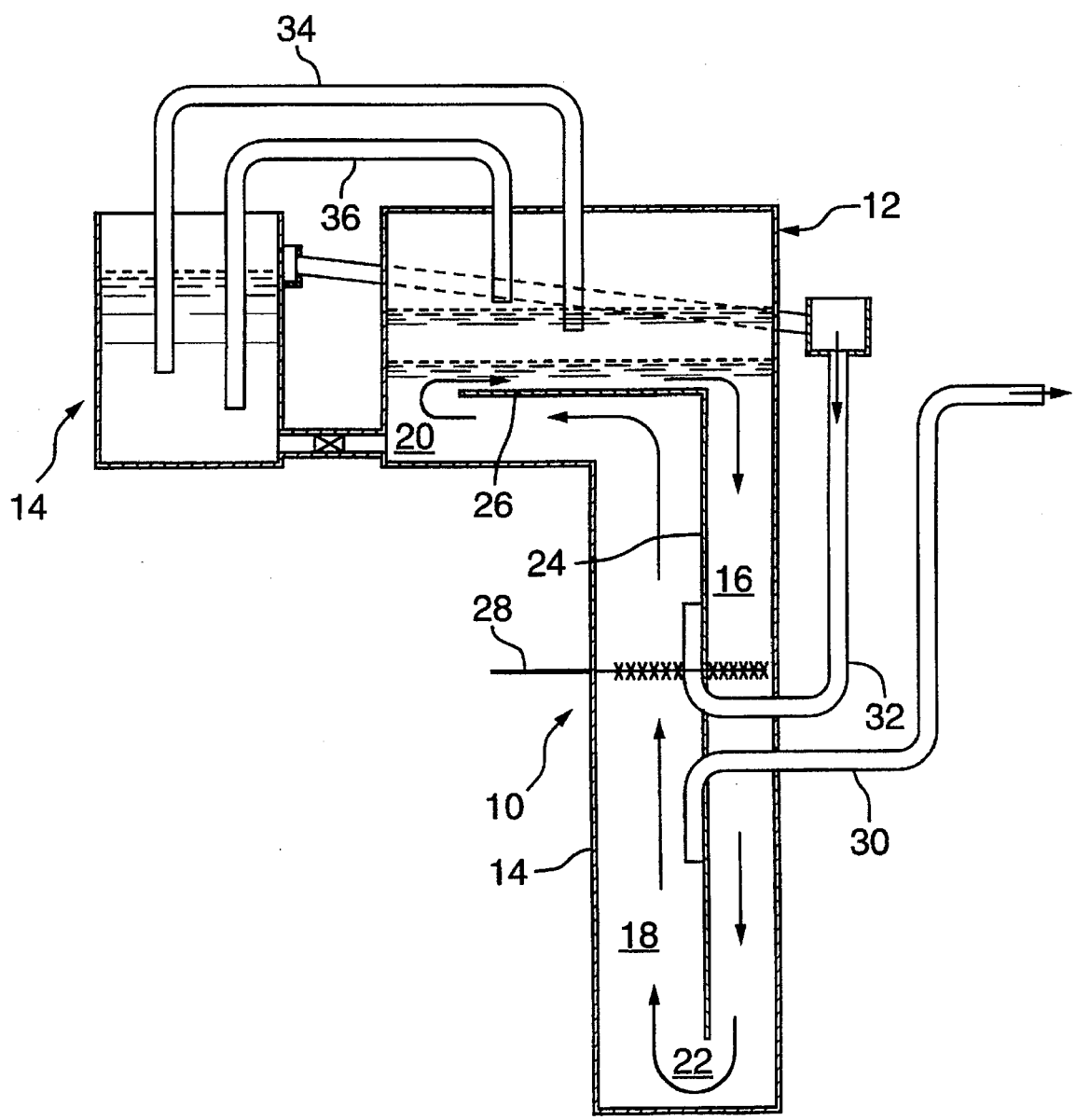
FIG. 1 represents a diagrammatic vertical sectional view of a prior art vertical shaft bioreactor system.

FIG. 1 illustrates the basic design of a typical prior art deep shaft bioreactor shown generally as 10 having a conventional head tank shown generally as 12, and an adjacent collection vessel shown generally as 14.

Bioreactor 10 has a downcomer 16 and a riser 18, operatively in communication with each other at their upper parts at region 20 within head tank 12, and at region 22 of lower part of bioreactor 10, to form a circulatory loop. Downcomer 16 and riser 18 are separated by a vertical partition 24 formed with a de-gassing plate 26 within a lower part of head tank 12, such that effluent liquor passes around de-gassing plate 26 before entering downcomer 16. Riser 18 has an oxygen-containing gas conduit 28, effluent liquid conduit 30, and influent liquid conduit 32. Head tank 12 has a pair of conduits 34, 36 in communication with collection vessel 14.

At normal operating rates, the liquid level in head tank 12 is shown by the lower water line. Aeration vent gas escapes through vent tube 34 since tube 34 offers the lowest back pressure because of its submergence depth in adjacent collection vessel 14.

As influent flow increases beyond extraction line 30, flow capability at the back pressure associated with the submergence depth of vent 34, the liquid level in head tank 12 rises as shown to the higher water line. The rising water level "closes off" the open end of vent 34 in tank 12 and aeration gas is forced to escape through vent 36.

Vent 36 is at a greater submergence depth than vent 34 and therefore offers greater head tank back pressure. The increased head tank pressure translates to higher flow in line 30 and equilibrium flow is restored.

Figure 2:
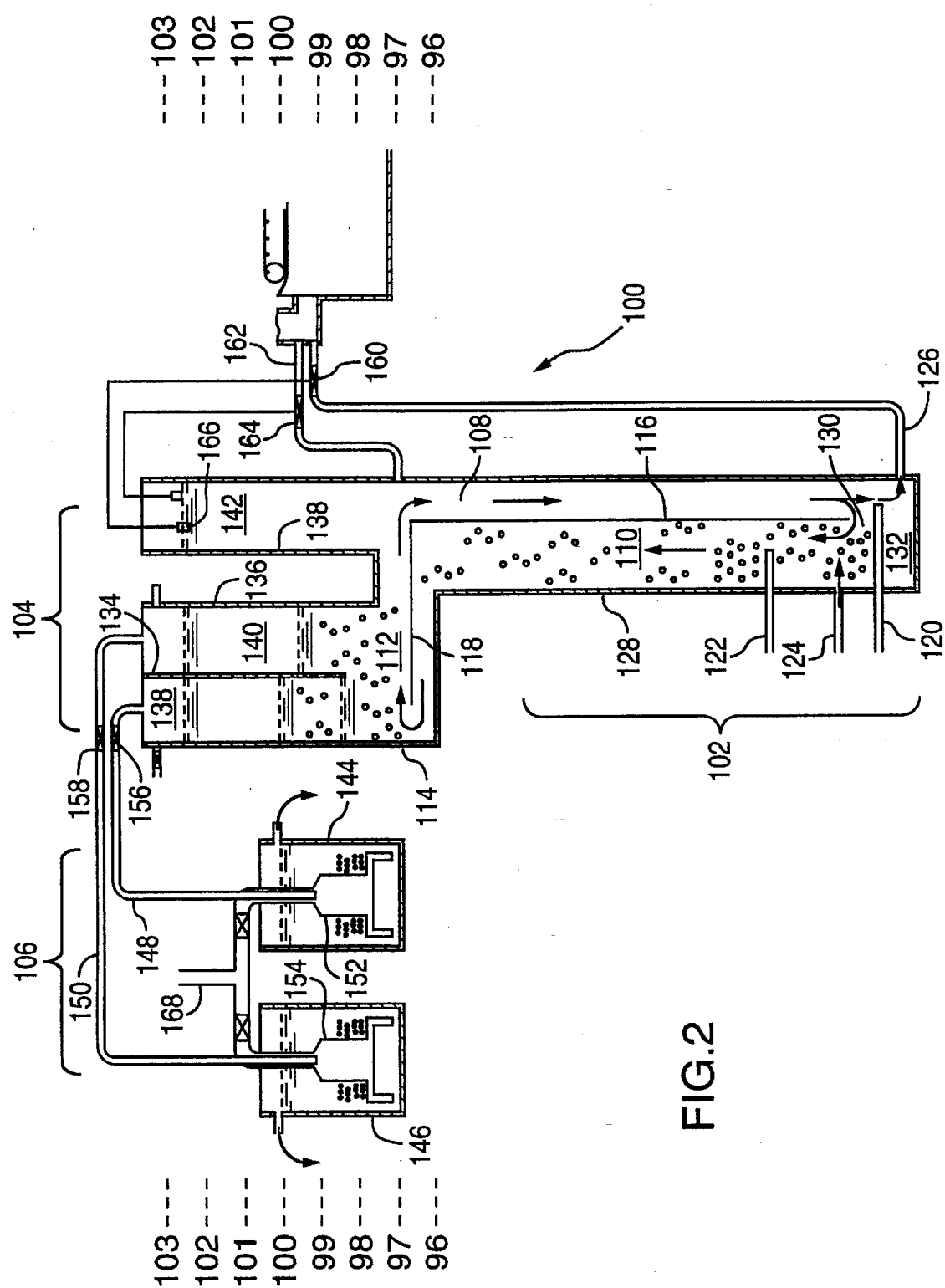
FIG. 2 represents a diagrammatic vertical sectional view of a bioreactor system having a head tank biofilter assembly according to the invention.

With reference to FIG. 2, this shows a multi-channel vertical shaft bioreactor, head tank and bio-filtration system shown generally as 100, wherein the vertical shaft bioreactor is shown generally as 102, head tank assembly 104 and bio-filter assemblies 106.

Bioreactor 102 has a downcomer 108 and a riser 110, operatively in communication with each other at their upper parts at region 112 and at lower parts of region 113 to form a circulatary loop. Communication at region 112 is through a head tank 114. Bioreactor 102 has downcomer 108 separated from riser 110 by partition 116, which is formed with a de-gassing plate 118 at a lower part of head tank 114, such that effluent liquor passes around de-gassing plate 118 before entering downcomer 108. Back-mix region 130 and riser 110 have oxygen-containing gas conduits 120 and 122, respectively. A waste conduit 124 operatively opens at depth into riser 110, and a treated waste effluent conduit 126 operatively discharges from depth of bioreactor system 102.

Compressed air enters the system through start up aerator conduit 122 into up-flow region 110 between partition 116 and reactor wall 128. Influent wastewater enters the system through influent conduit 124 and is circulated by air lift through up-flow region 110, into head surface tank 114, around de-gassing plate 118 and is re-circulated back down the shaft through downflow region 108. The effluent then enters back-mixing region 130 for further aeration and mixing. A portion of the effluent rises again through up-flow region 110 for recycling, while the remaining portion flows to the shaft bottom, against the upflow of air from deep aerator 120. Influent conduit 124 enters upflow region 110 at a point below the position of aerator 122 to assist in the reduction of voidage (volume of air: volume of liquid ratio), this voidage increases as gas expands at lower pressures as it rises up through region 110. The cross-sectional area of region 108 is minimized in order to maximize cross-sectional area of upflow region 110, which in effect reduces the flow rate of the upflow to increase residence time of the effluent and thereby increase the time for bioxidation activity. Effluent flowing to the shaft bottom enters plug flow region 132, with no internal recycle, that effects an oxygen soak zone to increase levels of dissolved oxygen in the effluent, before it enters deep extraction line 126 and leaves the system for further downstream treatment, such as to a flotation-sedimentation vessel.

Head tank 114 provides multiple and various off-gas back pressures within its confine. At an upper part thereof, head tank 114 has a pair of baffles 134 and 136, which with the walls and top portions of head tank 114 define off-gas receiving chambers 138, 140. A further wall of head tank 114 with an additional baffle plate 138 defines overflow of gas chamber 142. Chamber 142 provides a constant hydraulic head pressure on bioreactor 102. Each of chambers 138 and 140 is connected to its own biofilter 144, 146, respectively, through conduits 148, 150, respectively. Each of conduits 148, 150 is connected directly to its own aeration distribution sparger 152, 154, respectively, under control valves 156, 158, respectively.

Conduit line 126 is provided with a throttle valve 160. Head tank 114 at a lower part has a conduit 162 having a throttle valve 164 to provide a controllable shallow extraction line. Both deep extraction line 126 and shallow extraction line 162 are throttled to maintain, in this embodiment, a positive 2.5 m of head pressure in bioreactor 102.

In operation, the hydraulic head tank pressure on the vertical shaft is uniform and constant to ensure the required exit velocities from deep effluent extraction line which in turn aids in successful floc flotation. In order to treat foam, off-gas and volatile organic compounds from the vent gas stream, it is necessary to inject this stream under pressure and at depth in an oxidation tank, or in the embodiment described herein, the two off-gas aerated biofilters 144, 146. The filters operate at different back pressures, due to varying degrees of filter blockages, and thus, different head losses occur across each of the media beds. Accordingly, head tank 114 must provide a pressure from zero, when the vent gas line is open to atmosphere, to a maximum when the vent gas lines are shut during the backwash cycle, using control valves 156, 158. During these pressure changes, the liquid level in chamber 142 must remain relatively constant at +2.5 m in this embodiment, in order to maintain deep effluent extraction line critical velocity, to aid in flotation. The various pressure requirements, as described in the context of a multi-channel vertical shaft bioreactor are accomplished in the following manner:

When bioreactor 102 is at rest with no liquid or air flow each of chambers 138 and 140 assume a static water level of, say, for example, 100 m elevation, which is arbitrarily chosen as the flotation tank weir plate (not shown) overflow level. When compressed air is introduced to the shaft, circulation begins and the liquid level falls in an adjacent holding tank (not shown) and rises in chamber 142. As the liquid level in chamber 142 rises, effluent is forced out of the shaft through deep extraction line 126. Effluent in this line increases in velocity as the hydraulic head builds in chamber 142. Equilibrium is established between hydraulic head in chamber 142 and liquid velocity in deep extraction line 126. In this example, it is assumed that 2.5 m of hydraulic head in chamber 142 is required to maintain optimum extraction line velocity of 1.5 m/sec. The hydraulic head of water in chamber 142 is therefore established at 102.5 m and regulated there by level indicating devices controlling throttle valves 160 and 164 on the deep extraction line 126 and a shallow extraction line 162, respectively.

Gas that is injected into upflow region 110 is carried by circulating effluent to head tank 114, passed under de-gassing plate 118 and rises to the upper part of head tank 114 to occupy chambers formed by baffle 134. The gas/effluent stream generally contains 10–20% free gas in liquid (volume to volume). The velocity of the flow slows considerably in head tank 114 to approximately 0.15–0.30 m/sec. which allows the free off-gas to migrate out of the liquid. When off-gas conduits 148, 150 from head tank 114 are all closed at valves 156, 158, respectively, pockets of gas will accumulate in chambers 138 and 140 in about 8–10 minutes. Since water column head in chamber 142 is regulated is at +2.5 m elevation over static level, the trapped gas will likewise be under +2.5 m of head.

Baffles 136 and 138 extend approximately 1.0 m lower than baffle 134 so that as the gas pocket increases to +5.5 m of water column, vent gas escapes from the chambers by bubbling under baffle 136 and 138 percolating up through water column 142 to atmosphere. Water column 142 is approximately 5 times the cross section of the riser side of the shaft, and, therefore, venting all the head tank off-gas through chamber 142 will create only 2–4% voidage in water column 142. This amount of voidage in turn decreases the head tank pressure only slightly, i.e. about 5 cm. It should be noted that float control means 166 compensates automatically for voidage and, therefore, is a better level control device than an electronic level detector. This mode of operation occurs only when both vent gas valves 156, 158 have been closed off and none of biofilters 144, 146 are operating.

Under normal operation, vent gas conduits 148, 150 to off-gas aerated biofilters 144, 146 operate under approximately 2.5 m of back pressure. This is because a freshly washed filter, typically, has an aerated depth equal to the liquid overflow elevation of 100 m minus the vent gas sparger tubes 152,154 elevation of 97.5 m, in this example. A dirty filter, however, has an additional head loss across its bed. This additional head (approximately 15 cm) can be provided for in the initial set up and nm in settings. It should be noted that an up flow filter because of the overflow feature has less pressure variation than a downflow filter.

A dirty filter will have slightly more than 2.5 m of back pressure. Since the internal baffles are set at 98.5 m, any gas pressure in excess of 2.5 m will cause gas flow under the baffle of that head space chamber. Consequently, the filter gas flow will automatically shut down until the respective filter medium is back washed. Air that underflows the baffles 134 contributes to the adjacent pockets and to the remaining operating filter. If all filters become dirty at the same time, the vent gas will underflow baffle 136, 138, which are set at the 97.5 m level in this embodiment and the shaft vent gas will escape to atmosphere through chamber 142.

When an off-gas aerated biofilter 144 or 146 requires purging, the vent gas aeration conduits of the remaining filter is turned off by valves 156 or 158. This causes its respective back pressure to be cumulatively applied to the baffled head tank chamber 138 or 140, of the dirty filter to create approximately 5 m. Total Dynamic Head (T.D.H.) on its off-gas line. In addition, clarified backwash water is admitted by turning on a backwash water line 168. The head pressure on this line is created by either:

(a) stand alone backwash tank at appropriate elevation to achieve hydraulic head;

(b) separate pumping system; or (c) compressed air tank where shaft off-gas is check-valved into the tank and a small liquid pump pumps in clarified effluent to increase the off-gas pressure to required levels. The water is then released into the backwash line until the original pressure is reached. The cycle then repeats.

The preferred embodiment is method (a) but this is dependent upon specific plant requirements.

Vent gas aeration conduits 148, 150 may connect and may run inside the backwash water line and the resulting configuration creates a venturi effect of mixed off-gas and treated effluent, creating additional head pressure by increasing the density of the backwash line effluent. Water line, gas line, and venturi pressures combine to form the purge capabilities applied to the dirty filter beds.

It is to be understood that modifications to the embodiments of the invention described and illustrated herein can be made without departing from the scope and spirit of the invention as defined in the appended claims.

I claim:

1. A multi-channel vertical shaft bioreactor having a downcomer; a riser operatively in communication with said downcomer to form a loop; an off-gas head tank; a part of said loop being through said head tank; a de-gassing plate around which effluent liquor is de-gassed to produce a de-gassed liquor and an off-gas receivable by said head tank; oxygen containing gas injection means for injecting gas into said riser; liquid influent injection means to inject influent into said riser; means to extract liquid effluent from said bioreactor; the improvement comprising one or more vertical baffle plates disposed within an upper part of said head tank to define a plurality of off-gas receiving chambers; a plurality of biofilter means, a plurality of off-gas conduit means in communication with said chambers and said biofilter means to operably allow passage of off-gas from said chambers to said biofilter means to effect off-gas aeration in said biofilter means; and conduit off-gas control means.

2. A multi-channel vertical shaft bioreactor as defined in claim 1 comprising a downcomer;

a riser operatively in communication with said downcomer to form a loop;

an off-gas head tank;

wherein a part of said loop is through said head tank; a de-gassing plate around which effluent liquor is de-gassed to produce a de-gassed liquor and an off-gas receivable by said head tank; the improvement comprising a plurality of vertical baffle plates disposed within an upper part of said head tank to define a plurality of off-gas receiving chambers comprising a first chamber and a second chamber; a plurality of biofilter means comprising a first biofilter means and a second biofilter means;

a plurality of off-gas conduit means comprising a first conduit means in communication with said first chamber and said first biofilter means to operably allow passage of off-gas from said first chamber to said first biofilter means to effect off-gas aeration in said first biofilter means;

a second conduit means in communication with said second chamber and second biofilter means to operably allow passage of off-gas from said second chamber to said second biofitter means to effect off-gas aeration in said second biofilter means; first conduit control valve means; and second conduit control valve means.

3. A multi-channel vertical shaft bioreactor as defined in claim 2 further comprising a third chamber;

a third biofilter means;

a third conduit means in communication with third chamber and third biofilter means to operably allow passage of off-gas from said third chamber to said third biofilter means to effect off-gas aeration in said third biofilter means; and third conduit control valve means.

4. A bioreactor as defined in claim 2 comprising a first vertical baffle plate and a second vertical baffle plate disposed within and from an upper portion of said head tank, said second baffle plate being of greater length than said first baffle plate.

5. A bioreactor as defined in claim 4 wherein said head tank further comprises an overflow off-gas receiving chamber.

6. A bioreactor as defined in claim 5 further comprising liquid level sensing means in said over-flow off-gas receiving chamber; and effluent flow control means for controlling effluent flow in said effluent extraction means operatively connected to said liquid level sensing means.

7. A bioreactor as defined in claim 6 further comprising means for maintaining a constant hydraulic head above said riser and said downcomer.

8. A bioreactor as defined in claim 5 wherein each of said biofilter means causes said off-gas receiving chambers to contain off-gas at off-gas pressures and to operably provide off-gas pressure changes within said chambers as said biofilters block and provide corresponding liquid level changes within each chamber, while not affecting said liquid level in said overflow off-gas receiving chamber.

9. A bioreactor as defined in claim 8, wherein said liquid level changes in said overflow off-gas receiving chamber in consequence of changes in influent and effluent liquid flow into or out of, respectively, said bioreactor does not affect said gas pressures within said chambers.

10. A bioreactor as defined in claim 4 wherein said first conduit control valve means is closeable to effect increase in said first gas pressure and provide excess gas flow under said first baffle from said first chamber to said second chamber.

11. A bioreactor as defined in claim 4, wherein said first and said second control valve means are closeable to effect excess gas flow under said first and said second baffles to said overflow chamber, without substantially changing said liquid level in said overflow chamber.

* * * * *